United States Patent [19]

Hadekel

[11] 4,297,905

[45] Nov. 3, 1981

[54] GYROSCOPIC VERTICAL REFERENCE SYSTEM

[76] Inventor: Ruben Hadekel, 4 Lalor St., London SW6 5SR, England

[21] Appl. No.: 75,121

[22] Filed: Sep. 13, 1979

[30] Foreign Application Priority Data

Oct. 5, 1978 [GB] United Kingdom ............... 39371/78

[51] Int. Cl.³ ..................... G01C 19/12; G01C 19/20; G01C 19/52
[52] U.S. Cl. ..................................... 74/5.43; 33/327; 74/5.6 B; 74/5.8
[58] Field of Search ...................... 74/5.43, 5.6 B, 5.8; 308/DIG. 1; 33/326, 327, 327 B

[56] References Cited

U.S. PATENT DOCUMENTS

| | | | |
|---|---|---|---|
| 366,438 | 7/1887 | Tower | 74/5.8 X |
| 464,806 | 12/1891 | Tower | 74/5.8 |
| 2,086,897 | 7/1937 | Carter et al. | 33/327 X |
| 3,139,758 | 7/1964 | Lahde | 74/5.6 B |
| 3,412,472 | 11/1968 | Annen | 33/327 X |
| 3,492,879 | 2/1970 | Riordan et al. | 74/5.6 B |
| 3,498,145 | 3/1970 | Clark | 74/5.43 |
| 3,827,361 | 8/1974 | Zechnowitz et al. | 74/5.43 X |
| 3,985,034 | 10/1976 | Widner | 308/DIG. 1 |
| 4,000,660 | 1/1977 | Brodersen | 74/5.43 |
| 4,088,031 | 5/1978 | Sholes | 74/5.43 |

Primary Examiner—Rodney H. Bonck
Attorney, Agent, or Firm—Stevens, Davis, Miller & Mosher

[57] ABSTRACT

A vertical gyroscopic reference system consists of a gimballed platform solid with a stator in the form of a hollow spherical chamber in which a substantially spherical gyro rotor revolves, the rotor being both driven and supported by air pressure, and having a pressure-fed hole through its spin axis which cooperates with ports in the stator to provide signals to a pair of pneumatic actuators which slave the platform to follow the gyro rotor.

4 Claims, 6 Drawing Figures

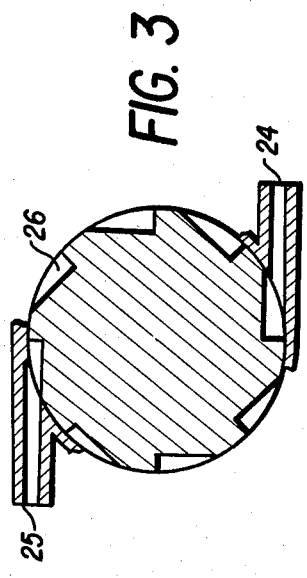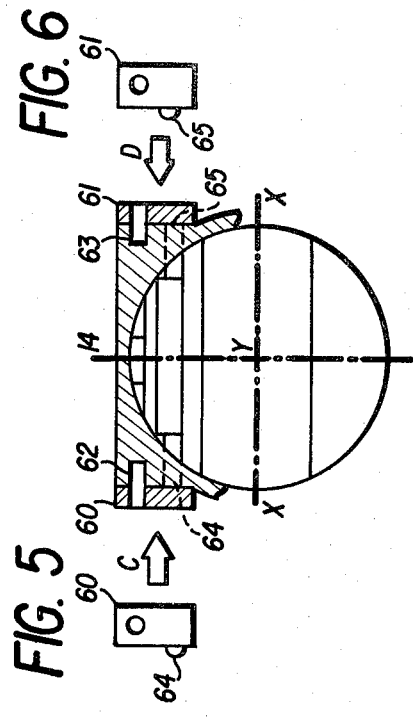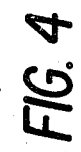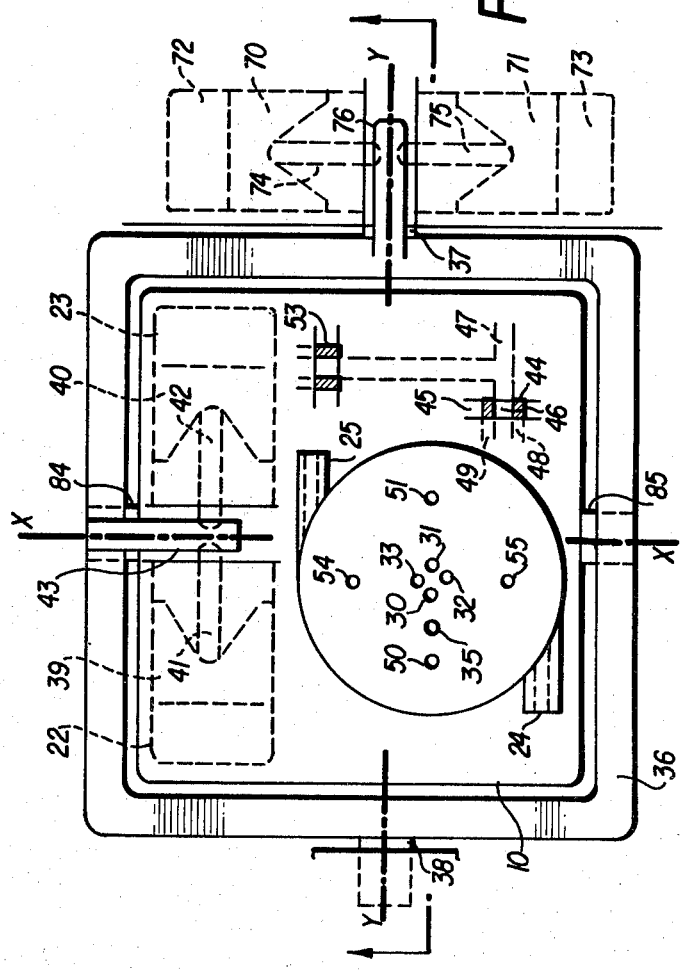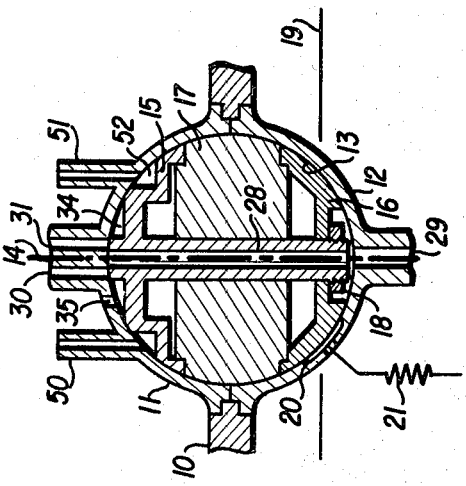

GYROSCOPIC VERTICAL REFERENCE SYSTEM

The first object of this invention is to provide an inexpensive gyroscopic reference system to define the vertical direction in boats, aircraft, and other vehicles. A further object is to provide a system of this type which avoids the use of electric motors or other electromagnetic devices, and is thereby capable of providing a stable horizontal platform for the mounting of devices intended to sense the earth's magnetic field, to provide a basis for a compass system. Yet another object is to provide a gyroscopic reference system which minimizes gyro drift by dispensing with gimbal suspension of the gyroscope rotor.

Gyroscopes spinning about a vertical axis, and thereby defining the local vertical, and by implication a horizontal plane (which is a plane perpendicular to the vertical) are in common use particularly in aircraft to give an artificial horizon display, and to provide attitude signals for an automatic pilot. It is also known to have gyroscopic reference systems known as "stable platforms", wherein a platform is slaved by servomotors to follow a gyro or a system of gyros which are mounted on it, and thereby constrained to remain horizontal regardless of changes in attitude of the vehicle in which it is carried. A number of different arrangements of gyros are known for this purpose, the gyros themselves consisting of a rotor running in bearings in a cage, which in turn is suspended in a pivot ("rate" or "rate integrating" gyros) or a gimbal ring with orthogonal pivots ("attitude gyro"), and their accuracy being dependent on maintaining low friction at the pivots. Such gyros may be driven by air or electricity, but known air-driven gyros are devices of limited performance in terms of accuracy, while electrically driven gyros affect the local magnetic field, and are therefore unsuitable for mounting on a platform which is to carry devices for sensing terrestrial magnetism.

One known arrangement for a stable platform is a single gyro spinning about a vertical axis, mounted on a gimballed platform. Sensing devices on the gyro give signals proportional to the error between the gyro spin axis and the perpendicular to the plane of the platform. These signals, after amplification if necessary, are fed to servo-motors which rock the platform about its gimbals in a sense tending to reduce the signals, and thereby constrain it to remain perpendicular to the spin axis of the gyro, within the limits of servo-mechanism errors.

It is normal practice to correct drift of a vertical gyro by an erection system based on pendulous devices or accelerometers (the two are equivalent) which give signals to slowly precess the gyro towards the apparent vertical, i.e., the direction of the resultant of gravity force, centrifugal force, and forces (or apparent forces) due to linear acceleration. It is also known to drive a gyroscope by means of air power, usually applied through a vacuum system.

A gyroscopic vertical reference system according to this invention consists of the following:

1. A gyro rotor kept spinning by air power, and of spherical shape apart from local relieved portions as described below, the rotor having a hole coaxial with its spin axis, through which air supplied at one end is fed at the opposite end to pairs of valve ports in the stator, thereby creating pneumatic signals which area measure of the angular displacement of the spin axis relative to the stator.

2. A stator consisting of a hollow sphere very slightly larger in diameter than the rotor, with a port at one end through which air is supplied to the passage through the rotor spin axis, and valve ports at the opposite end as mentioned in the preceding paragraph, and having three recesses spaced 120° apart in a plane perpendicular to the spin axis below the equatorial plane, to which air is fed through restriction orifices in such a manner as to cause the weight of the rotor to be supported by air pressure when the rotor is substantially concentric with the stator, thereby preventing mechanical contact between the two.

3. Means of precessing the gyro to correct drift, as described below.

4. A platform on which the gyro stator is rigidly mounted, the platform being hinged to a gimbal ring on an axis ("inner gimbal axis") perpendicular to the gyro spin axis, the gimbal ring being in turn hinged to the vehicle on an axis ("outer gimbal axis") perpendicular to both the inner gimbal axis and the spin axis, a pneumatic actuator capable of moving the platform relative to the inner gimbal axis, and another pneumatic actuator capable of moving the gimbal ring relative to the body, these actuators being fed with air signals from the valve ports in the stator in a manner to keep the platform perpendicular to the gyro spin axis.

In the accompanying drawings:

FIG. 1 is a view of one embodiment of the invention as seen from above.

FIG. 2 is a partial section through the spin axis of the gyro in FIG. 1.

FIG. 3 is a section through the equatorial plane of the gyro rotor of FIG. 1.

FIG. 4 is a section through the spin axis of the gyro showing details of an alternative erection system.

FIG. 5 is a view on arrow C of FIG. 4.

FIG. 6 is a view on arrow D of FIG. 4.

Referring to FIGS. 1 and 2, the platform 10 is solid with a gyro stator conveniently consisting of two halves 11, 12 which together define a hollow spherical surface 13. The gyro rotor revolves within this surface around a vertical axis 14, with some clearance, and consists essentially of a spherical surface relieved as described below. The rotor is conveniently constructed of two relatively light portions 15, 16 and a heavy "equatorial" zone 17, clamped together by a nut 18.

The stator is formed with three depressions symmetrically located with respect to a plane 19 perpendicular to the spin axis 14, and spaced 120° apart. One of these depressions is shown at 20 in FIG. 2. Depression 20 is supplied with air under pressure through restrictor 21, and the other two depressions through similar restrictors. Each restrictor and the clearance between the gyro rotor and stator in the neighborhood of the corresponding depression constitute a pneumatic potentiometer, and the presence in depression 20 (for instance) rises as the rotor approaches the stator in its neighborhood. With suitable proportioning of the depressions and restrictors this results in the gyro rotor being maintained at a fixed clearance from the stator, approximately equal to half the difference between their diameters. The gyro rotor is thus effectively floated on air, and requires no gimbal suspension.

The rotor is driven in known manner by pressure air applied at tangential nozzles 24, 25, impinging on depressions in the rotor's equatorial plane such as 26 as shown in FIG. 3.

Reverting to FIGS. 1 and 2, the rotor is formed with a hole 28 through its spin axis, fed with pressure air at one end through a connection 29 in the stator. The opposite end of hole 28 cooperates with ports 30, 31, 32, 33 in the stator, and a relieved zone 34 in the rotor communicating with atomsphere through holes 35 in the stator, to form a valve. Thus if the gyro spin axis shifts in relation to the platform about axis XX, a pressure differential is developed between ports 30 and 31, while if the shift is about axis YY a pressure differential is developed between ports 32 and 33.

The platform is formed with trunnions 84, 85 pivoting in bearings in a gimbal ring 36 which define axis XX, and the gimbal ring is formed with trunnions 37, 38 which pivot in bearings in the body of the vehicle which define axis YY.

A pneumatic actuator is provided which can rock the platform about axis XX, and which may conveniently consist of pistons 39, 40 fitted with seals (not shown) sliding in bores 22, 23 formed in the platform above the level of axis XX, and pushing through rods 41, 42 on a projection 43 of the gimbal ring. The pistons 39, 40 are connected to ports 30 and 31, the effect of this arrangement being that the actuator moves the platform until ports 30 and 31 are symmetrical with respect to hole 28 in the rotor, i.e., the platform follows displacements of the gyro spin axis about axis XX. A similar actuator at right angles to the first, consists of pistons 70, 71 sliding in bores 72, 73 formed in the body of the vehicle and pushing through rods 74, 75 on a projection 76 of the gimbal ring. Pistons 70, 71 are connected to ports 32, 33 and constrain the platform to follow movements of the gyro rotor about axis YY. The net effect of the two actuators is that the platform is slaved to remain perpendicular to the spin axis of the gyro rotor.

As is usual in gyroscopes, provision must be made to correct for drift of the gyro spin axis caused by inaccuracies and earth curvature, and this is usually done by slowly precessing the gyro towards the apparent vertical as sensed by pendulums or accelerometers.

For this purpose, there is provided a mass 44 moving in a slot 45, and having a port 46 fed with pressure air through a passage 47, port 46 cooperating with ports 48 and 49 to form a valve. The mass 44 is either hinged about an axis parallel to YY above it center of gravity, or suspended on springs which control its motion in direction XX, and in either case, it will move if the plane of the platform tilts away from the horizontal about axis YY. Ports 48, 49 are connected to nozzles 50, 51 in the stator, the jets from which impinge on the bottom of a groove 52 in the rotor. The effect of this is that displacement of the platform about axis YY causes a precession torque to be applied about an axis parallel to XX. Another mass 53 similar to 44, and with similar valve ports, is arranged to sense displacement of the platform about axis XX, and to apply a precession torque to the rotor about an axis parallel to YY, through nozzles 54 and 55. The effect of this arrangement is that the gyro rotor is slowly precessed towards the apparent vertical as sensed by the masses 44 and 53.

An alternative method—known per se—of drift correction is shown in FIGS. 4, 5 and 6. In this arrangement the stator carries pendulous (or spring restrained) masses 60, 61 pivoting on pins 62, 63, which partially close ports 64, 65 which serve as escape ports for the air which drives the rotor. If the stator inclines about axis XX, one of the ports 64, 65 will increase in size and the other decrease, causing more air to escape from one side than the other, and thus producing a precession torque about axis YY. A similar pair of masses in a plane at right angles senses movement about axis YY and applies a corresponding precession torque about axis XX.

If it is convenient to use vacuum rather than pressure as a power source, this could be done for instance by enclosing the whole platform in a pressure tight chamber, the inside of which is connected to a source of vacuum, while the "pressure" connections in the previous description will be connections to atmosphere.

Because the gyro itself (as distinct from the platform, which is power driven) has no gimbal bearings, it is possible to achieve high accuracy (i.e., low drift) with quite simple construction. Moreover, the use of pneumatics throughout results in simple servo actuators to slave the platform, and also makes the platform suitable as a mounting for devices intended to sense terrestrial magnetism, as a basis for a compass system.

I claim:

1. A gyroscopic vertical reference system comprising a rotor of substantially spherical shape driven and supported by air pressure and revolving about a vertical spin axis in a stator formed as a hollow spherical chamber, said chamber being rigidly mounted on a gimballed platform, said rotor being formed with a hole through its spin axis, said hole being fed with pressure air at one end and the opposite end being surrounded with a groove in the rotor leaving a small land between said groove and said hole, the groove communicating with atmosphere, and the hole and groove cooperating with ports in the stator to create pressure differences corresponding to a displacement between rotor and stator representing a deviation of the rotor spin axis from the perpendicular to the platform, said pressure differences being fed to pneumatic actuators in a sense enabling these actuators to drive said platform in a direction which annuls the displacement and restore the perpendicularity of the platform to the spin axis.

2. A system as claimed in claim 1, wherein pendulous devices or accelerometers provide pneumatic signals which are applied to the gyro rotor to precess it towards the apparent vertical.

3. A system as claimed in claim 1, wherein the supporting means for the rotor comprises three or more depressions in the stator at equal angular spacings and located at the same distance from the equatorial plane, each depression being fed with pressure air through a restrictor, in such a manner that the said restrictor in conjunction with the resistance of the leakage path around the depression causes the pressure in the depression to rise as the rotor approaches it, thereby maintaining the rotor at fixed clearance from the stator without mechanical contact between them.

4. A gyroscopic vertical reference system comprising: a rotor of substantially spherical shape driven and supported by air pressure and revolving about a vertical spin axis in a stator formed as a hollow spherical chamber, said chamber being rigidly mounted on a gimballed platform, said rotor being formed with a hole through its spin axis pneumatically communicating at one end thereof with a supply port in said stator, said fluid supply port being axially aligned with and supplying pressurized air to said one end of said rotor hole, said rotor having a land area surrounding the other end of said rotor hole and a first groove surrounding said land area, said first groove communicating with atmosphere and said hole and first groove pneumatically communicating with a plurality of sensing ports provided in said stator for sensing pressure differences representing deviation of said rotor spin axis from the perpendicular to said platform, said rotor including a second groove surrounding said spin axis; pressure actuators for moving said platform relative to said rotor spin axis; means supplying sensed pressure differences to said actuators causing said actuators to move said platform in a direction which annuls displacement of said rotor spin axis from the perpendicular to said platform; and additional ports provided in said stator for supplying pressurized air to said second rotor groove to precess said rotor toward the apparent vertical.

* * * * *

UNITED STATES PATENT AND TRADEMARK OFFICE
CERTIFICATE OF CORRECTION

PATENT NO. : 4,297,905
DATED : Nov. 3, 1981
INVENTOR(S) : Ruben HADEKEL

It is certified that error appears in the above—identified patent and that said Letters Patent is hereby corrected as shown below:

Column 1, line 66, please change "area" to -- are a --.

Signed and Sealed this

Second Day of February 1982

[SEAL]

Attest:

Attesting Officer

GERALD J. MOSSINGHOFF

Commissioner of Patents and Trademarks